United States Patent
Getman et al.

(10) Patent No.: US 10,148,926 B2
(45) Date of Patent: Dec. 4, 2018

(54) IMAGING APPARATUS AND IMAGE PROCESSING METHOD OF THEREOF

(71) Applicant: Samsung Electronics Co., Ltd., Suwon-si, Gyeonggi-do (KR)

(72) Inventors: Alexander Getman, Hwasung (KR); Ilia Ovsiannikov, Hwasung (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 261 days.

(21) Appl. No.: 14/961,161

(22) Filed: Dec. 7, 2015

(65) Prior Publication Data
US 2017/0163951 A1 Jun. 8, 2017

(51) Int. Cl.
| | |
|---|---|
| *H04N 9/64* | (2006.01) |
| *G06T 5/00* | (2006.01) |
| *H04N 9/04* | (2006.01) |
| *H04N 9/73* | (2006.01) |
| *G06T 3/40* | (2006.01) |

(52) U.S. Cl.
CPC ........... *H04N 9/646* (2013.01); *G06T 3/4015* (2013.01); *G06T 5/002* (2013.01); *G06T 5/004* (2013.01); *G06T 5/008* (2013.01); *G06T 5/009* (2013.01); *H04N 9/045* (2013.01); *H04N 9/735* (2013.01); *G06T 2207/10024* (2013.01); *G06T 2207/20024* (2013.01); *G06T 2207/20208* (2013.01)

(58) Field of Classification Search
CPC ........ H04N 9/646; H04N 9/045; H04N 9/735; G06T 5/004; G06T 5/008; G06T 5/002; G06T 2207/20024; G06T 2207/10024; G06T 2207/20208
See application file for complete search history.

(56) References Cited

U.S. PATENT DOCUMENTS

| | | | |
|---|---|---|---|
| 3,971,065 A | 7/1976 | Bayer | |
| 7,710,437 B2 | 5/2010 | Kang | |
| 7,916,207 B2 | 3/2011 | Moon et al. | |
| 8,040,413 B2 | 10/2011 | Egawa et al. | |
| 8,314,863 B2 | 11/2012 | Tachi | |
| 8,582,007 B2 | 11/2013 | Kim et al. | |
| 8,755,640 B2 * | 6/2014 | Saito | H04N 9/045 382/300 |

(Continued)

FOREIGN PATENT DOCUMENTS

| | | |
|---|---|---|
| KR | 10-0808494 B1 | 2/2008 |
| KR | 10-1332689 B1 | 11/2013 |

OTHER PUBLICATIONS

A. Buades, B. Coll et al., "A non-local algorithm for image denoising", IEEE Int. Conf. on Computer Vision and Pattern Recognition, 2005.

(Continued)

*Primary Examiner* — Jason A Flohre
(74) *Attorney, Agent, or Firm* — Harness, Dickey & Pierce, P.L.C.

(57) ABSTRACT

An imaging apparatus may include an image sensor that includes a Bayer color filter array (CFA) of 2-by-2 cell groups each of which includes a red pixel, a blue pixel, and two green pixels, and an image signal processor for processing raw data from the Bayer CFA. The image signal processor corrects the raw data to reduce artifacts such as image contrast degradation caused by using green pixels with wide transmission spectrum.

8 Claims, 7 Drawing Sheets

(56) References Cited

U.S. PATENT DOCUMENTS

| | | | |
|---|---|---|---|
| 8,922,683 B2 | 12/2014 | Hayashi et al. | |
| 2008/0088857 A1* | 4/2008 | Zimmer | H04N 5/23229 358/1.6 |
| 2008/0292219 A1* | 11/2008 | Keall | H04N 5/357 382/313 |
| 2010/0157091 A1* | 6/2010 | Honda | H04N 9/045 348/223.1 |
| 2010/0231770 A1* | 9/2010 | Honda | H04N 9/045 348/308 |
| 2013/0242148 A1 | 9/2013 | Mlinar et al. | |
| 2014/0125838 A1* | 5/2014 | Mackey | H04N 9/045 348/224.1 |

OTHER PUBLICATIONS

Gwanggil Jeon et al., "Demosaicking of Noisy Bayer-Sampled Color Images With Least-Squares Luma-Chroma Demultiplexing and Noise Level Estimation", Image Processing, IEEE Transactions on, pp. 145-156 vol. 22, Issue: 1, Jan. 2013.

Li, X.; Gunturk et al., "Image Demosaicing: A Systematic Survey", In Proc. SPIE, vol. 6822, 68221J, 2008.

\* cited by examiner

FIG. 4A
FIG. 4B
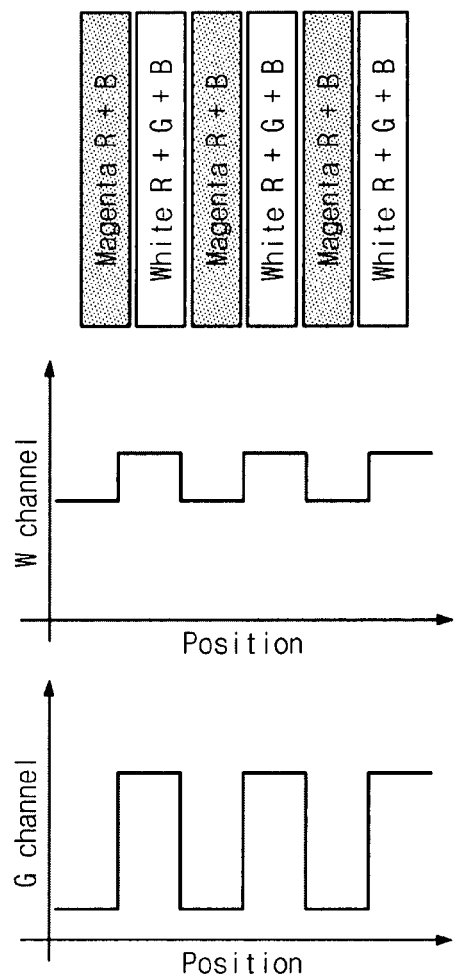
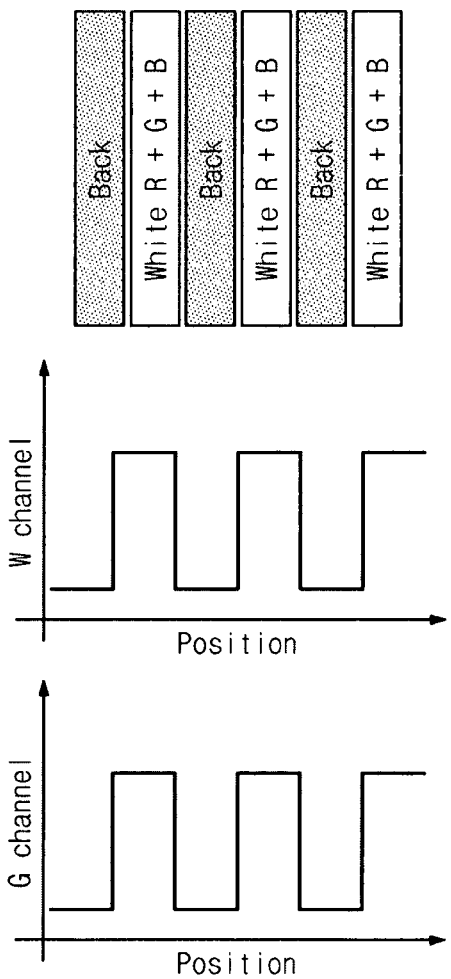

IMAGING APPARATUS AND IMAGE PROCESSING METHOD OF THEREOF

BACKGROUND

The example embodiments of the inventive concepts described herein relate to an imaging apparatus and/or an image processing method thereof.

An imaging apparatus may include an electronic image sensor for electronic expression of a visual image. The electronic image sensor may include one of a charge coupled device (CCD) image sensor and an active pixel sensor (APS), where the APS is manufactured by a complementary metal-oxide semiconductor (CMOS) process, and thus, the APS may be referred to as a "CMOS sensor".

Generally, the electronic image sensor includes a plurality of light-sensitive pixels in which rows and columns are regularly arranged. To capture a color image, a filter pattern is generally formed on a pixel pattern. Moreover, different filter materials may be used such that each of pixels senses a light within a portion of a visible spectrum. Accordingly, a color filter may reduce the amount of light that reaches each pixel, thereby reducing a light sensitivity of each pixel.

SUMMARY

Example embodiments of the inventive concepts provide an imaging apparatus capable of reducing or preventing artifacts, and/or an image processing method thereof.

In accordance with some example embodiments of the inventive concepts, an image signal processing method of an imaging apparatus may include receiving raw data from an array where a red pixel, a wide green pixel, and a blue pixel are repeatedly arranged, recovering a local variation of a wide green channel captured from the wide green pixel and correcting the raw data, performing a white balance with respect to the corrected raw data, performing a denoising with respect to the corrected raw data, performing a demosaicing for recovering color channels missed from the corrected raw data, performing a sharpening with respect to the corrected raw data, and performing a color correction with respect to the corrected raw data.

The recovering of the variation may include performing an image sharpening using an unsharp mask filter.

The unsharp mask filter may be a linear filter that satisfies $W_{sharp} = W_{original} + \alpha \cdot (W_{original} - W_{blurred})$. The $W_{sharp}$ is a sharpened signal. The $W_{original}$ is an original signal. The $W_{blurred}$ is a blurred signal. The $\alpha$ is a parameter that denotes strength of the linear filter.

The $\alpha$ may satisfy $$\alpha = \frac{\langle G_{est} \cdot W_{original} \rangle - \langle G_{est} \rangle \cdot \langle W_{original} \rangle}{\langle W_{original}^2 \rangle - \langle W_{original} \rangle^2} - 1.$$

The $G_{est}$ is an estimation value of a green spectral element. The function < > denotes an average value of some local regions.

The $G_{est}$ may satisfy $G_{est} = a_1 \cdot R + a_2 \cdot W + a_3 \cdot B$. The $a_1$, $a_2$, and $a_3$ are free parameters. The R is a value of a red signal. The W is a value of a wide green signal. The B is a value of a blue signal.

In accordance with other example embodiments of the inventive concepts, an imaging apparatus may include an image sensor that includes a Bayer color filter array (CFA) of 2-by-2 cell groups each of which includes a red pixel, a blue pixel, and two green pixels, and an image signal processor for processing raw data from the Bayer CFA. The image signal processor may correct the raw data such that a local contrast of a wide green channel from each of the wide green pixels corresponds to at least one contrast of the red pixel and the blue pixel, thereby reducing artifacts and may process an image of the corrected raw data.

In some example embodiments, the method may further include performing an image sharpening with respect to green white channels of the raw data by the image signal processor.

In some example embodiments, the method may further include performing an image sharpening using an estimation value of a green channel by the image signal processor.

In some example embodiments, the estimation value of the green channel may be calculated at a given position either as directly sampled or interpolated from neighboring pixels.

In accordance with other example embodiments of the inventive concepts, an imaging method may include receiving, via a receiver, raw data from a Bayer color filter array (CFA); and reducing artifacts, via a processor, in the raw data based on a green channel.

In some example embodiments, the artifacts include a reduced contrast of a wide green channel such that a contrast of the wide green channel is less than a contrast of a wide green channel.

In some example embodiments, the reducing includes reducing the artifacts by adjusting, via the processor, a local contrast of a wide green channel associated with the raw data such that the local contrast of the wide green channel corresponds to the local contrast of the green channel.

In some example embodiments, the reducing reduces the artifacts prior to subjecting the raw data to one or more of image sharpening and denoising the raw data.

In some example embodiments, the method further includes determining a strength of a filter utilized to reduce the artifacts based on a correlation analysis between the wide green channel and the green channel.

BRIEF DESCRIPTION OF THE FIGURES

The above and other objects and features will become apparent from the following description with reference to the following figures, wherein like reference numerals refer to like parts throughout the various figures unless otherwise specified, and wherein

FIGS. 4A and 4B are diagrams illustrating a contrast loss of a W channel in the case of using a color filter having a wide transmission spectrum;

DETAILED DESCRIPTION

Figure 1:
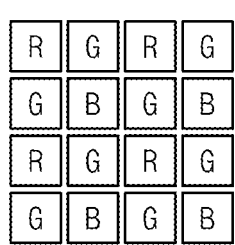
FIG. 1 is a diagram illustrating a general Bayer color filter array and transmission spectrums of color filters thereof.
Figure 1:
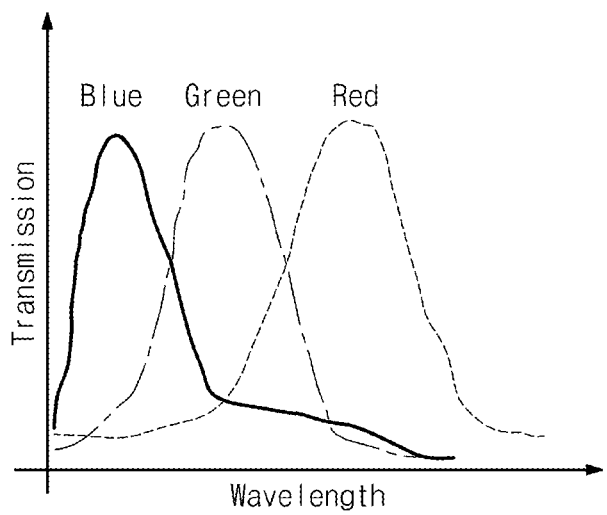

Example embodiments will be described more fully hereinafter with reference to the accompanying drawings, in which some example embodiments are shown.

While the example embodiments are susceptible to various modifications and alternative forms, specific example embodiments thereof are shown by way of example in the drawings and will herein be described in detail. It should be understood, however, that there is no intent to limit the example embodiments to the particular forms disclosed, but on the contrary, the example embodiments are to cover all modifications, equivalents, and alternatives falling within the spirit and scope of the example embodiments.

It will be understood that, although the terms "first," "second," "A," "B," etc. may be used herein in reference to elements of the example embodiments, such elements should not be construed as being limited by these terms. For example, a first element could be termed a second element, and a second element could be termed a first element, without departing from the scope of the example embodiments.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe example embodiments is not intended to limit the scope of the example embodiments. The articles "a," "an," and "the" are singular in that they have a single referent, however the use of the singular form in the present document should not preclude the presence of more than one referent. In other words, elements of the example embodiments referred to as in singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which these example embodiments belong. It will be further understood that terms in common usage should also be interpreted as is customary in the relevant art and not in an idealized or overly formal sense unless expressly so defined herein.

Generally, a light sensitivity of a color image sensor having a Bayer color filter array (CFA) may be limited by a transparency of color filters. Example embodiments disclose how to improve (or, alternatively, optimize) transmission spectrums of color filters and how to correct side effects caused by the optimization. Optimization of the CFA may include widening of a transmission spectrum of "green" color filter material of the Bayer CFA. Moreover, side effects may be corrected based on modification of an image signal processor (hereafter 'ISP') such that the ISP is configured to work with the modified CFA.

The light sensitivity of an imaging apparatus may be an important parameter for determining an image quality under a limited illumination level. Besides other factors, the light sensitivity scales proportionally to a pixel area, and thus when pixel size is reduced, additional efforts may be utilized to compensate for a decrease in the light sensitivity. The pixel size may be reduced to increase camera resolution without changing physical dimensions of the camera module. Therefore, a more effective pixel structure may be required when increasing camera resolution.

FIG. 1 is a diagram illustrating a general Bayer color filter array and transmission spectrums of color filters thereof.

As illustrated in FIG. 1, generally, color images may be registered using a Bayer color filter array (CFA) image sensor. The Bayer CFA may include 2-by-2 cells which include a red pixel, a blue pixel, and two green pixels, and the 2-by-2 cells may be repeatedly arranged in the Bayer CFA. A color of a pixel may be determined by color filter material for transmitting a light within a target wavelength range. The name of a pixel color may be based on a visual appearance of a white light that passes through a filter, and may be used for a brief description below.

It may be desirable to carefully select the transmission spectrum of a filter. For example, if the transmission band is too narrow, then excessive blockage of pixel illumination may result, thus lowering the whole pixel sensitivity. In contrast, if the transmission band is too wide or improperly selected, then color reproduction may be affected and indistinct artifacts may appear. Thus, on one side of the scale there is a highly sensitive pixel having color filters with wide transmission band but poor color reproduction and on the opposite side there is a pixel with narrow band, good color reproduction but poor sensitivity. Therefore, conventionally, when increasing the light sensitivity of each pixel by widening the transmission band, color reproduction and indistinct artifacts may occur. In contrast, in one or more example embodiments, an imaging apparatus may compensate for side effects when pixels having wide transmission spectrums are used.

Figure 2:
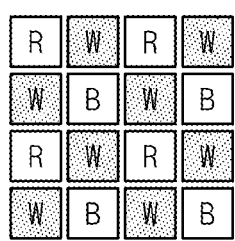
FIG. 2 is a diagram illustrating an image sensor having a Bayer CFA and transmission spectrums according to an example embodiment of the inventive concepts.
Figure 2:
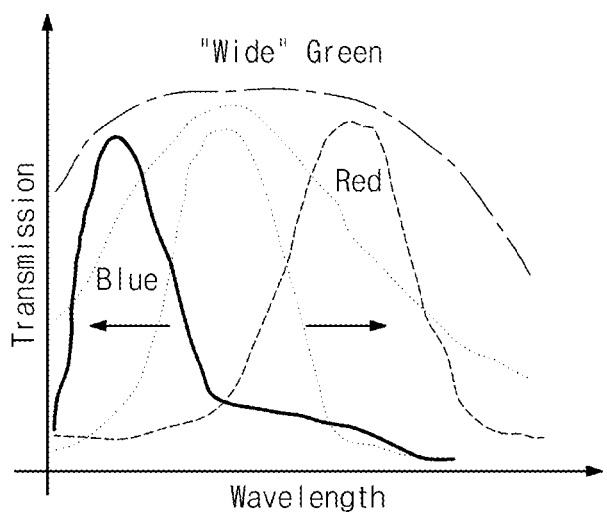

FIG. 2 is a diagram illustrating an image sensor having a Bayer CFA according to an example embodiment of the inventive concepts.

Referring to FIG. 2, a transmission window of a green channel may be wider than that of a general RGB sensor and may include a human-visible band in extreme cases. A green channel may refer to a signal captured through a green pixel. A CFA of an imaging apparatus according to an example embodiment of the inventive concepts may be referred to as "RWB Bayer CFA". Here, "W" may mean a wide green color or a white color. Moreover, the imaging apparatus according to an example embodiment of the inventive concepts may include an image signal processor (ISP) which recovers a final image with low-noise and/or prepares an output of a sensor.

Figure 3:
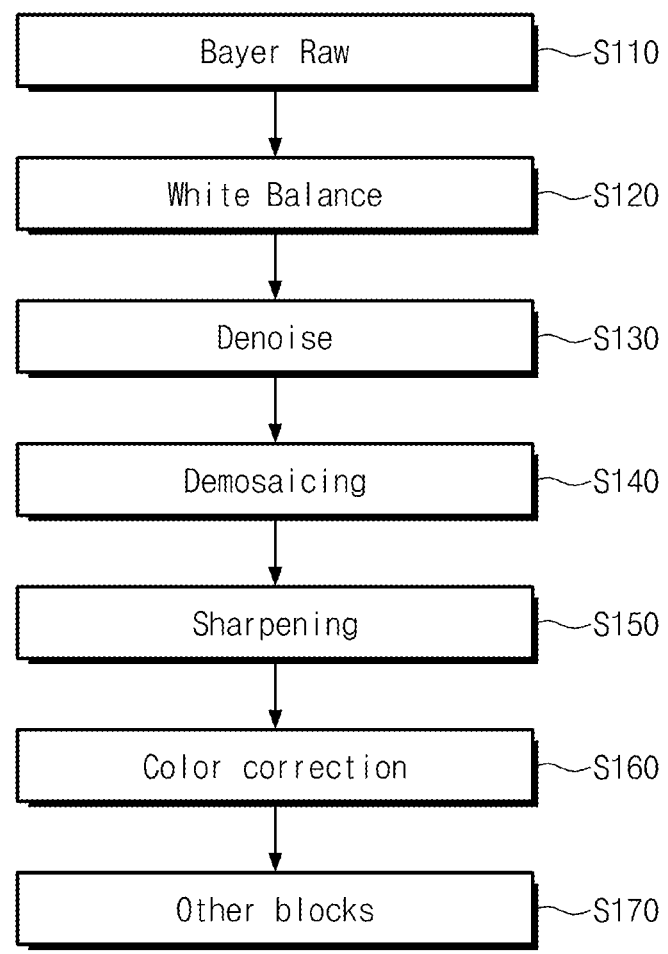
FIG. 3 is a flowchart illustrating a method of operating an ISP designed for a general RGB Bayer CFA.

FIG. 3 is a flowchart illustrating a method of operating an ISP designed for a general RGB Bayer CFA. A method of operating an ISP will be described with reference to FIG. 3.

Referring to FIG. 3, in operation S310, a controller (e.g., the controller 120 of FIG. 8) may receive Raw data from a Bayer color filter array (CFA). The raw data may be essentially processed from a sensor to obtain correct image data.

In operation S120, a controller (e.g., the controller 120 of FIG. 8) may perform a white balance for tone neutrality of a grey object.

In operation S130, a controller (e.g., the controller 120 of FIG. 8) may denoise to remove a chromatic noise and a luminance noise. For example, an effective model of luminance denoising may be an adaptive weighted average of pixels having a similar brightness. Reduction in a color noise may be modeled with denoising of a color difference that increases color channel correlation.

In operation S140, a controller (e.g., the controller 120 of FIG. 8) may demosaic to recover color channels missed from the raw data which is mosaicked.

In operation S150, a controller (e.g., the controller 120 of FIG. 8) may sharpen to compensate for an image blurring caused by a camera lens and to improve contrast of an image.

In operation S160, a controller (e.g., the controller 120 of FIG. 8) may perform color correction to transform raw color channels (or color signals) of a camera into a standard color domain (e.g., sRGB). The color correction may makes a camera output independent from transmission spectrums of the color filters used in the CFA image sensor. The effective model of the color correction may be expressed according to a linear transformation, for example, according to the following Equation 1.

$$\begin{bmatrix} sR \\ sG \\ sB \end{bmatrix} = \|CCM\| \cdot \begin{bmatrix} R_{raw} \\ G_{raw} \\ B_{raw} \end{bmatrix}$$ [Equation 1]

In Equation 1, "CCM" may denote a 3-by-by-3 color correction matrix. One of the properties of the color correction block is that it can amplify color noise of the final image if CCM has large singular values. For this reason, it may be desired to have high-quality color denoising in the chain.

In operation S170, a controller (e.g., the controller 120 of FIG. 8) may perform other operations, such as bad pixel correction, lens shading, and gamma corrections, and the like may be performed.

In some example embodiments, the image sharpening of operation S150 may be performed before the demosaicing of operation S140. However, example embodiments are not limited thereto. For example, the demosaicing may be performed before the image sharpening. The order of the above-described operations may not be limited thereto disclosed herein.

As described above, widening the transmission spectrum of the green color filter of the Bayer CFA may cause image artifacts. The image artifacts may include a reduced contrast of color objects that have similar brightness of a W channel (i.e., a wide green channel) but different R and B values (i.e. Red and Blue channels). Chromatic contrast degradation may occur because the W channel has lower sensitivity to spectral variations than a G channel (i.e., a green channel).

FIGS. 4A and 4B are diagrams illustrating a contrast loss of a W channel in the case of using a color filter having a wide transmission spectrum. FIG. 4A may illustrate a contrast of a white/magenta pattern, and FIG. 4B may illustrate a contrast of a black/white pattern.

Referring to FIG. 4A, contrasts of magenta stripes printed on a white paper may be compared for a RGB Bayer sensor and a RWB Bayer sensor. Ideally, it may be assumed that equivalent signals for a red pixel, a green pixel, and a blue pixel of the RGB Bayer sensor are generated in white region. The same white region captured with the RWB Bayer sensor may include the same signals for red and blue pixels and a triple signal for a W pixel. The situation for a magenta region may become different from that for the white regions. The RGB sensor may have unchanged red and blue signals when a value of a green signal turns into zero. The RWB sensor may have unchanged red and blue signals when a value of a W signal is two times larger than that of red or blue signals.

While no difference exists between a red channel (or a red signal) and a blue channel (or a blue signal) in both the RGB sensor and the RWB sensor, contrast of W channel may be smaller than a contrast of a G channel. In real scenes with other color combinations, the situation may be similar. As a transmission band of a W color filter widens, the degree of contrast degradation may increase. The contrast degradation may be referred to as a color blindness of a W pixel.

Referring to FIG. 4B, not all color combinations will result in contrast degradation as we replace G pixel with W. For example, combination of Black and White stripes will have same contrast for G and W channels regardless of color filter transmission window width, as illustrated in FIG. 4B. This may mean that the contrast degradation depends on image contents.

When using the RWB sensor in an RGB Bayer ISP, the color blindness of a W channel may cause contrast problems in a final image. The reason may be that a Bayer chain utilizes the fact that there are 2 times more green pixels than red or blue pixels and image sharpening, denoising and demosaicing is performed using this well-sampled channel. In particular, the contrast degradation of an output image from an ISP may occur when color denoising or sharpening is performed.

Figure 5:
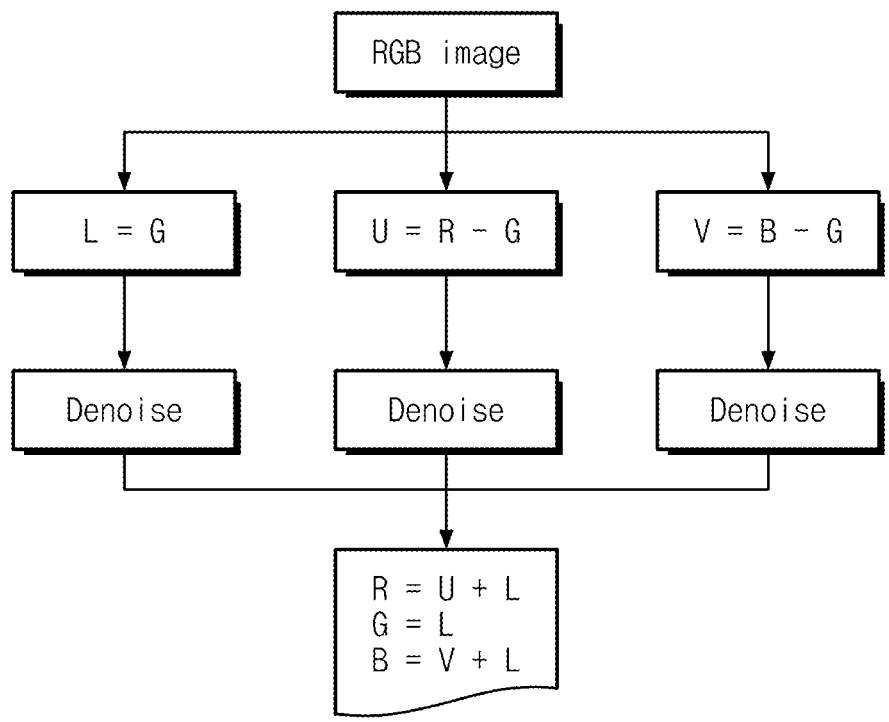
FIG. 5 is a flowchart illustrating a method of performing a color denoising by a general RGB Bayer ISP.

FIG. 5 is a flowchart illustrating a method of performing color denoising in a general RGB Bayer ISP.

Referring to FIG. 5, denoising may be used to increase correlations between red, green and blue channels. Generally, a green channel may be treated as a luminance and may be denoised less than a color difference between U and V components. This brings local variations of Red and Blue channels towards that of luminance (i.e. Green). When Green channel is replaced with W the local variations of luminance will decrease in amplitude due to the contrast degradation. This in turn, will reduce local contrast of Red and Blue components as well as the contrast of the output image of the ISP.

Effect of W pixel on Sharpening part of conventional RGB Bayer ISP is similar to that of denoising. The sharpening effect is achieved by mixing original image with amplified high-pass filtered version of the same image. Typically only luminance component of the source image is taken into account when calculating high-pass and Green channel is the dominant contributor into the luminance component. As in case of denoising, this means that the amplitude of high-pass image may also decrease for some color combinations when RWB sensor is used with unmodified RGB Bayer chain.

Figure 6:
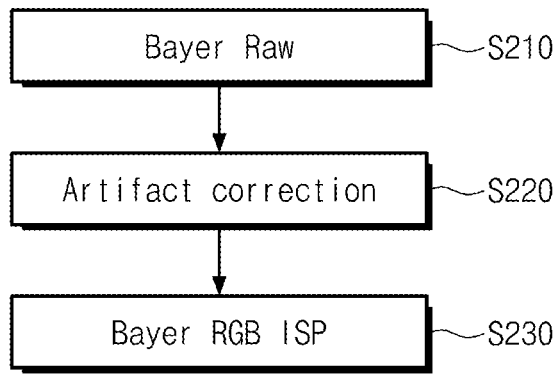
FIG. 6 is a flowchart illustrating an overall processing operation of a RWB image for a general Bayer RGB ISP, according to an example embodiment of the inventive concepts.

FIG. 6 is a flowchart illustrating a preprocessing operation of a RWB image for a general Bayer RGB ISP according to an example embodiment of the inventive concepts.

Referring to FIG. 6, in operation S210, a controller (e.g., the controller 120 of FIG. 8) may receive a Bayer Raw image.

In operation S220, a controller (e.g., the controller 120 of FIG. 8) may correct artifacts, which may be caused by the color blindness of wide green color channel before a general RGB Bayer ISP.

In operation S230, a controller (e.g., the controller 120 of FIG. 8) may analyze cross-channel correlations, and modify a raw image to fit to the general RGB Bayer ISP.

Figure 7:
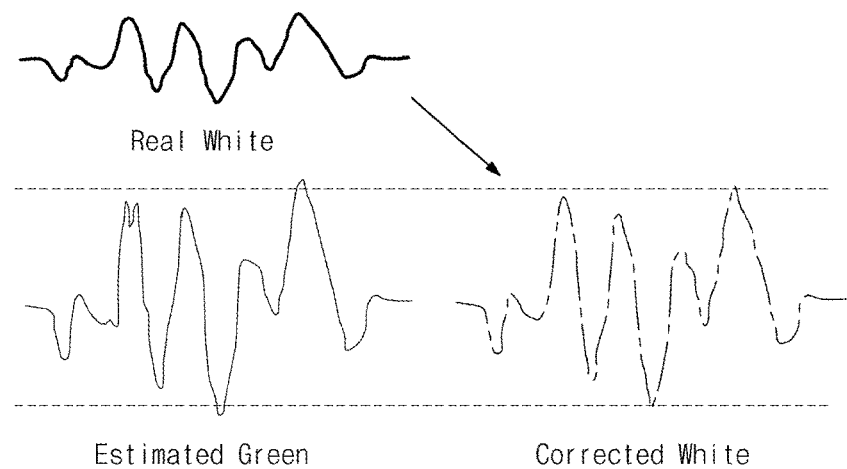
FIG. 7 is a graph describing the process of reduction of contrast degradation artifacts of an RWB imaging sensor according to an example embodiment of the inventive concepts.

FIG. 7 is a graph for schematically describing reduction of contrast degradation artifacts of an RWB imaging apparatus according to an example embodiment of the inventive concepts.

Referring to FIG. 7, a controller (e.g., the controller 120 of FIG. 8) may perform contrast degradation compensation to recover a local variation of a W channel to be similar to that of a green channel that could be captured if color filter with narrow spectrum is used. This is schematically illustrated in FIG. 7 using 1-dimensional signals. The local variation may be recovered using content dependent unsharp masking. Here, filter strength may be determined by correlation analysis of a real W color channel and an estimated green channel derived from available R, W and B channels. Other color channels (e.g., R and B channels) may not be affected by the artifact correction operation.

Enhancement of a local contrast of a W channel may have direct effect on the final output of a general ISP chain, and sharpness of a processed RWB image may become similar to that of a general Bayer. In particular, both color denoising and sharpening may use a luminance signal that has sharpness similar to that of the estimated green channel.

During the first part of a RWB correction component, a controller (e.g., the controller 120 of FIG. 8) may perform image sharpening that is modeled with a linear filter, for example, by using Equation 2 to model an unsharp mask filter.

$$W_{sharp} = W_{original} + \alpha \cdot (W_{original} - W_{blurred})$$ [Equation 2]

In Equation 2, $W_{sharp}$ may be a sharped signal. $W_{original}$ may be an original signal. $W_{blurred}$ may be a blurred signal. Referring to Equation 2, $W_{sharp}$ may be obtained by adding a difference between $W_{original}$ and $W_{blurred}$. The sharpening strength parameter $\alpha$ may be defined as the filter strength, and may be computed by the second part of the RWB artifact correction component. A size of a blurring kernel used for computation of $W_{blurred}$ may be a free parameter that is chosen to produce a (desired, or alternatively, an optimal) image quality.

During the second part of the RWB correction component, a controller (e.g., the controller 120 of FIG. 8) may compute the sharpening strength parameter $\alpha$. In some example embodiments, the sharpening strength parameter $\alpha$ may be expressed according to Equation 3.

$$\alpha = \frac{\langle G_{est} \cdot W_{original} \rangle - \langle G_{est} \rangle \cdot \langle W_{original} \rangle}{\langle W_{original}^2 \rangle - \langle W_{original} \rangle^2} - 1$$ [Equation 3]

In Equation 3, $G_{est}$ may be an estimation value of a true green spectral component of an image. $\langle \ \rangle$ may denote an average value in some local regions. Equation 3 is designed to provide enough sharpening to make local variations of the $W_{sharp}$ channel similar to that of $G_{est}$. For example, if local variations of the $W_{sharp}$ is half of the $G_{est}$, the sharpening strength parameter $\alpha$ may become "1". This may mean that the local variance of $W_{sharp}$ channel is increased two times. Accordingly, when local variations of both $W_{sharp}$ and $G_{est}$ are the same, the sharpening strength parameter $\alpha$ may become"0". At this time, there may be no need to alter a final image.

It may be possible that the sharpening strength parameter $\alpha$ estimated using Equation 3 is negative. In this case, RWB correction logic may determine that $W_{original}$ signal has more details than the estimated green and cause image blur. Here, some methods such as applying of a nonnegative constraint to the sharpening strength parameter $\alpha$ may be used. Other kinds of methods may be possible. For example, methods for improving noise robustness and numerical stability of division may be applied to Equation 3.

There may be many methods for estimating a green signal to compute Equation 3. For example, a linear combination of known channels may be used. This may be expressed according to Equation 4.

$$G_{est} = a_1 \cdot R + a_2 \cdot W + a_3 \cdot B$$ [Equation 4]

In Equation 4, $a_i$ (i.e., i is one of 1, 2, or 3) may be a free parameter. Equation 4 assumes that all color channels are available at a given position either as directly sampled or interpolated from neighboring pixels.

One of the properties of the RWB artifact correction ISP component according to an example embodiment of the inventive concepts may be that sharpening is guided by the local variations of image contents and may ignore average signal levels.

An imaging apparatus according to an example embodiment of the inventive concepts, for example, a controller (e.g., the controller 120 of FIG. 8) may be implemented to perform an RWB artifact correction, as described with reference to Equation 2, Equation 3, and Equation 4.

Meanwhile, there may be various embodiments that make local contrast of a signal the same as those of other signals under noise. In an example embodiment, a detailed description about an artifact correction method will be described below.

The RWB color blindness artifact correction may amplify local contrast of a W channel by some factors. Some factors may make resultant local contrast of a W channel similar to those of some reference estimated signals such as a green channel. The reference signals may be estimated in turn from the local values (possibly interpolated values) of the sensor color channels (e.g., R, W or B). The term "local contrast" may mean a difference between the original signal (e.g., W or $G_{est}$) and its smoothed version. The similarity of the local contrasts may mean that both magnitudes and phases of the difference signals should be close to each other.

The imaging apparatus according to an example embodiment of the inventive concepts may include an RGB Bayer CFA. To increase a light sensitivity, the transmission spectrum of the green filter may be widened.

In an example embodiment, the imaging apparatus may include an ISP that recovers red, green, and blue color elements which are standards of a scene captured from pixels of a sensor.

In an embodiment, when a general RGB ISP is properly used, an artifact prevention configuration may control an output signal from a sensor.

In an embodiment, the artifact prevention configuration may be implemented such that a portion of a sensor ISP is integrated.

In an embodiment, the artifact prevention configuration may be approximated by Equation 2, Equation 3, and Equation 4.

The imaging apparatus according to an example embodiment of the inventive concepts may enhance local contrast of a wide green (e.g., W) color channel to be similar to those of some reference signals. Here, some reference signals may be a combination of R, W, and B signals.

Figure 8:
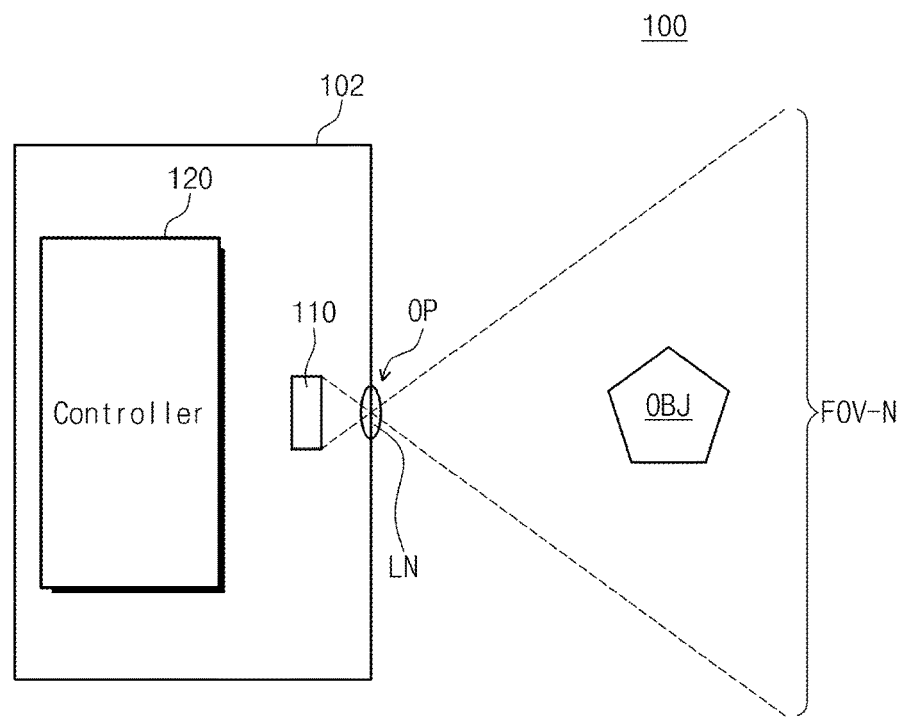
FIG. 8 is a block diagram illustrating an imaging apparatus according to an example embodiment of the inventive concepts.

FIG. 8 is a block diagram illustrating an imaging apparatus 100 according to an example embodiment of the inventive concepts.

Referring to FIG. 8, an imaging apparatus 100 may include a case 102 and an opening OP in the case 102. A lens LN may be optionally provided in the opening OP or may be omitted.

The imaging apparatus 100 may include a pixel array 110 according to an embodiment of the inventive concept. The pixel array 110 may receive a light through the opening OP such that the imaging apparatus 100 captures an image of an object OBJ, a person, or a landscape. As illustrated in FIG. 8, a nominal Field of View FOV-N may be defined using the pixel array 110 and the opening OP. Even though two-dimensionally illustrated in FIG. 8, the nominal Field of View FOV-N and the object OBJ may be 3-dimensional. Moreover, when the lens LN is provided, a real visibility may be different from the nominal Field of View FOV-N. The imaging apparatus 100 may be arranged such that the object OBJ, person, or landscape to be imaged exists in a real field of view.

In an example embodiment, the pixel array 110 may include a RWB color filter array described with reference to FIGS. 1 to 7.

The imaging apparatus 100 may further include a controller 120 that controls an operation of the pixel array 110 and other components of the imaging apparatus 100. The controller 120 may be optionally integrated with the pixel array 110 and may be integrated with other components of the imaging apparatus 100. To prevent or reduce artifacts described with reference to FIGS. 1 to 7, the controller 120 may be implemented to include a part or all of an ISP.

The imaging apparatus 100 may render an image using elements captured by the pixel array 110. Pixels of the pixel array 110 may capture elements of the image. In various embodiments, the pixel array 110 may have a two-dimensional array of pixels. The pixel array 110 may include pixel rows and pixel columns.

In some example embodiments, the controller 120 may include a processor and a memory (not shown). The memory may contain computer readable code, that, when executed by the processor, configures the processor as a special purpose computer to perform pre-processing on an image signal by converting local contrast of a wide green channel into those of other channels. Therefore, the controller 120 may improve the functioning of the imaging apparatus 100 itself by allowing pixels to have an increased sensitivity to light while reducing chromatic contrast degradation.

Meanwhile, example embodiments of the inventive concept may be applied to a data processing system.

Figure 9:
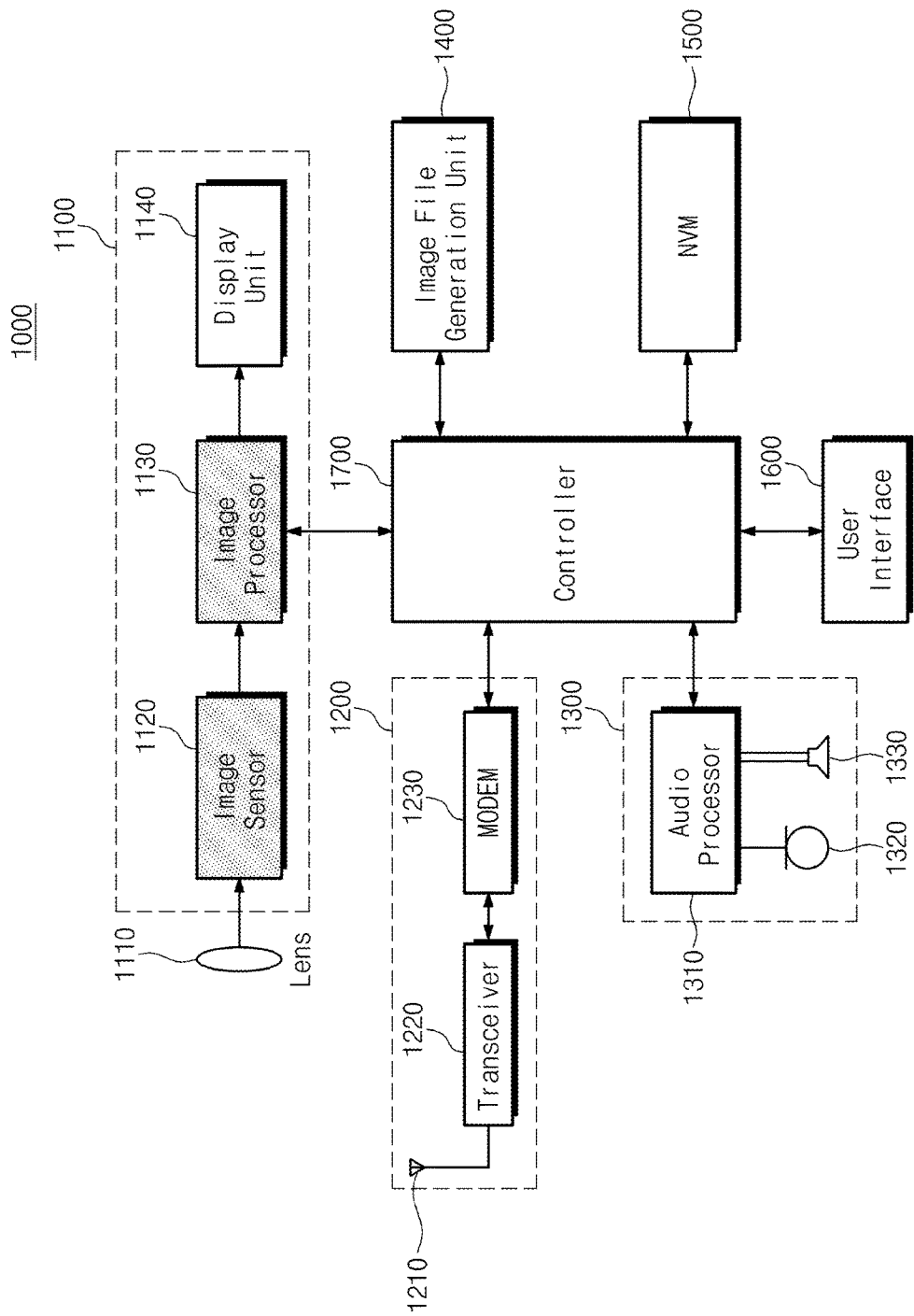
FIG. 9 is a block diagram illustrating a mobile device according to an example embodiment of the inventive concepts.

FIG. 9 is a block diagram illustrating a mobile device according to an example embodiment of the inventive concepts.

Referring to FIG. 9, a mobile device 1000 according to an example embodiment of the inventive concepts may include an image processing unit 1100, a wireless transceiver unit 1200, an audio processing unit 1300, an image file generation unit 1400, a nonvolatile memory device 1500, a user interface 1600, and a controller 1700.

The image processing unit 1100 may include a lens 1110, an image sensor 1120, an image processor 1130, and a display unit 1140. In an example embodiment, the image sensor 1120 may be implemented with an RWB color filter array described with reference to FIGS. 1 to 8. The image processor 1130 may be implemented to include an ISP that reduces or prevents artifacts described with reference to FIGS. 1 to 8.

The wireless transceiver unit 1200 may include an antenna 1210, a transceiver 1220, and a modulator/demodulator (MODEM) 1230. The audio processing unit 1300 may include an audio processor 1310, a microphone 1320, and a speaker 1330. Here, the nonvolatile memory device 1500 may be a memory card (e.g., multi-media card (MMC), embedded multi-media card (eMMC), secure digital (SD), micro SD), or the like according to an embodiment of the inventive concept. The controller 1700 may be a system on chip (SoC) that operates an application program, an operating system, or the like. A kernel of an operating system running on the SoC may include a device driver that controls an input/output scheduler and the nonvolatile memory device 1500. Based on the number of synchronization queues managed in an input/output scheduler, the device driver may control an access performance of the nonvolatile memory device 1500 or may control a central processing unit (CPU) mode, a dynamic voltage & frequency scaling (DVFS) level, or the like of the SoC.

The mobile device 1000 according to an embodiment of the inventive concept may be applied to a mobile phone, a tablet personal computer (PC), and a digital camera.

Figure 10:
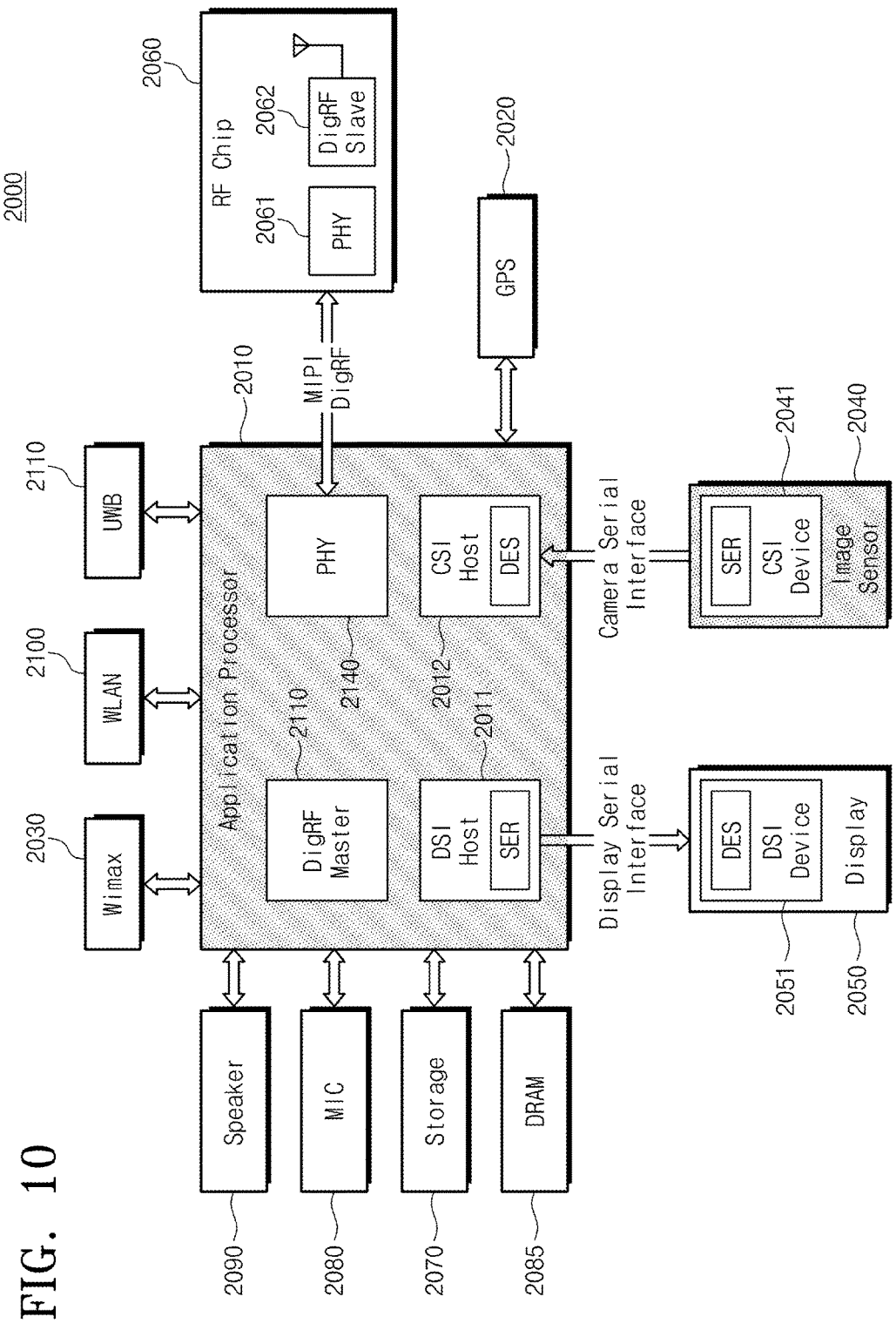
FIG. 10 is a block diagram illustrating an electronic system including an image sensor and an interface according to an example embodiment of the inventive concepts.

FIG. 10 is a block diagram illustrating an electronic system including an image sensor and an interface according to an example embodiment of the inventive concepts.

Referring to FIG. 10, an electronic system 2000 may be implemented with a data processing device capable of using or supporting a mobile industry processor interface (MIPI), such as a mobile phone, a personal digital assistant (PDA), a portable multimedia player (PMP), or a smartphone.

The electronic system 2000 may include an application processor 2010, an image sensor 2040, and a display 2050.

A camera serial interface (CSI) host 2012 included in the application processor 2010 may perform serial communication with a CSI device 2041 of the image sensor 2040 through a CSI. Here, an optical deserializer may be implemented in the CSI host 2012, and an optical serializer may be implemented in the CSI device 2041. In an example embodiment, the application processor 2010 may be implemented to include a configuration or a function of an ISP for reducing or preventing artifacts, as described with reference to FIGS. 1 to 8.

A display serial interface (DSI) host 2011 included in the application processor 2010 may perform serial communication with a DSI device 2051 of the display 2050 through a DSI. Here, an optical serializer may be implemented in the DSI host 2011, and an optical deserializer may be implemented in the DSI device 2051.

The image sensor 2040 may include a RWB color filter array described with reference to FIGS. 1 to 8.

The electronic system 2000 may include a RF chip 2060 capable of communicating with the application processor 2010. A PHY 2140 of the application processor 2010 and a PHY 2061 of the RF chip 2060 may transmit or receive data based on MIPI DigRF.

The electronic system 2000 may further include a GPS 2020, storage 2070, a microphone 2080, a dynamic random access memory (DRAM) 2085, and a speaker 2090, and the electronic system 2000 may convey communications using WiMAX 2030, WLAN 2100, and UWB 2110, or the like.

Example embodiments of the inventive concepts may be implemented with more microchips or an integrated circuits which are connected to each other through a motherboard, hardware logic, software stored in a memory device and executed by a microprocessor, firmware, an application specific integrated circuit (ASIC), a field programmable gate array (FPGA), or a combination thereof.

According to example embodiments of the inventive concepts, an imaging apparatus and an image processing method thereof may similarly convert local contrast of a wide green channel into those of other channels to process an image signal, thereby reducing or preventing artifacts.

While example embodiments of the inventive concepts have been described with reference to some example embodiments, it will be apparent to those skilled in the art that various changes and modifications may be made without departing from the spirit and scope of the example embodiments. Therefore, it should be understood that the above embodiments are not limiting, but illustrative.

What is claimed is:

1. An image signal processing method performed by an imaging apparatus, the method comprising:
    receiving raw data from an array, the array having a red pixel, a wide green pixel, and a blue pixel therein;
    correcting the raw data by adjusting a local variation of a wide green channel captured from the wide green pixel;
    white balancing the corrected raw data;
    denoising the corrected raw data;
    demosaicing the corrected raw data to recover color channels missing from the corrected raw data;
    image sharpening the corrected raw data; and
    performing a color correction with respect to the corrected raw data, wherein
        the correcting including image sharpening by applying an unsharp mask filter.

2. The method of claim 1, wherein the unsharp mask filter is a linear filter that satisfies:

$$W_{sharp} = W_{original} + \alpha \cdot (W_{original} - W_{blurred}),$$

wherein $W_{sharp}$ is a sharpened signal, $W_{original}$ is an original signal, $W_{blurred}$ is a blurred signal, and $\alpha$ is a parameter that denotes strength of the linear filter.

3. The method of claim 2, wherein $\alpha$ satisfies:

$$\alpha = \frac{\langle G_{est} \cdot W_{original} \rangle - \langle G_{est} \rangle \cdot \langle W_{original} \rangle}{\langle W_{original}^2 \rangle - \langle W_{original} \rangle^2} - 1,$$

wherein
    $G_{est}$ is an estimation value of a green spectral element, and
    the function $\langle \ \rangle$ denotes an average value of some local regions.

4. The method of claim 3, wherein $G_{est}$ satisfies:

$$G_{est} = a_1 \cdot R + a_2 \cdot W + a_3 \cdot B,$$

wherein
    $a_1$, $a_2$, and $a_3$ are free parameters,
    R is a value of a red signal,
    W is a value of a wide green signal, and
    B is a value of a blue signal.

5. The method of claim 1, wherein the correcting comprises:
    adjusting a local contrast of the wide green channel based on an estimate of a green channel derived from samples of the wide green channel, a red channel and a blue channel.

6. The method of claim 1, further comprising:
    performing one of a bad pixel correction, a lens shading, and a gamma correction on the corrected raw data.

7. An imaging method performed by an imaging apparatus comprising:
    receiving, by a receiver, raw data from a Bayer color filter array (CFA);
    reducing artifacts caused by a reduced contrast of a wide green channel having wide transmission spectrum, by a processor, in the raw data based on an estimation of a green channel having narrow transmission spectrum; and
    determining, by the processor, a strength of a filter utilized to reduce the artifacts based on a correlation analysis between a local variation of the wide green channel and a local variation of the estimated green channel, wherein
        the reducing includes reducing the artifacts by adjusting, by the processor, a local contrast of the wide green channel associated with the raw data such that the local contrast of the wide green channel corresponds to a local contrast of the green channel.

8. The imaging method of claim 7, wherein the reducing includes correcting the artifacts prior to subjecting the raw data to one or more of image sharpening and denoising the raw data.

* * * * *